United States Patent
Matsuda et al.

(10) Patent No.: US 7,586,580 B2
(45) Date of Patent: Sep. 8, 2009

(54) LIQUID CRYSTAL DISPLAY DEVICE AND METHOD FOR MANUFACTURING LIQUID CRYSTAL DEVICE

(75) Inventors: Fumitoshi Matsuda, Yokohama (JP); Masanori Nouchi, Yokohama (JP); Ryo Otsuka, Yokohama (JP)

(73) Assignee: Infovision Optoelectronics Holdings Limited, Tortola (VG)

( * ) Notice: Subject to any disclaimer, the term of this patent is extended or adjusted under 35 U.S.C. 154(b) by 291 days.

(21) Appl. No.: 11/382,934

(22) Filed: May 12, 2006

(65) Prior Publication Data

US 2007/0139605 A1 Jun. 21, 2007

(30) Foreign Application Priority Data

Dec. 21, 2005 (JP) .............................. 2005-368516

(51) Int. Cl.
*G02F 1/1333* (2006.01)
*G02F 1/1339* (2006.01)

(52) U.S. Cl. .................. 349/158; 349/155; 349/156; 349/157

(58) Field of Classification Search .......... 349/155–158
See application file for complete search history.

(56) References Cited

U.S. PATENT DOCUMENTS

| | | | | |
|---|---|---|---|---|
| 5,307,190 A | * | 4/1994 | Wakita et al. | ............... 349/158 |
| 5,672,083 A | | 9/1997 | Curtin et al. | |
| 6,332,690 B1 | * | 12/2001 | Murofushi | ................... 362/611 |
| 6,654,071 B2 | * | 11/2003 | Chen | ............................ 349/12 |
| 7,190,503 B2 | | 3/2007 | Ide | |
| 2001/0046008 A1 | * | 11/2001 | Ueda et al. | ..................... 349/74 |
| 2002/0047952 A1 | * | 4/2002 | Kawata | ....................... 349/58 |
| 2006/0098153 A1 | * | 5/2006 | Slikkerveer et al. | ......... 349/187 |
| 2007/0139605 A1 | | 6/2007 | Matsuda et al. | |

FOREIGN PATENT DOCUMENTS

JP 58-052513 Y 4/1983
JP 09197135 A 7/1997

OTHER PUBLICATIONS

Office action of U.S. Appl. No. 11/423,960 mailed on Feb. 24, 2009.
Office Action of U.S. Appl. No. 11/423,960 mailed on Apr. 17, 2009.

* cited by examiner

*Primary Examiner*—Frank G Font
*Assistant Examiner*—Jerry Blevins
(74) *Attorney, Agent, or Firm*—Nixon Peabody LLP

(57) ABSTRACT

Curved-panel liquid crystal display and method of its manufacture are realized without necessitating drastic changes to the display structure or to the steps in its manufacture, and without requiring new materials or manufacturing technology. The back side of a liquid crystal panel is set on first concavely curved spacers that support two opposing edges of the panel back side. Second concavely curved spacers are set on the front side of the two opposing panel edges. Third spacers of uniform height are disposed on the panel back side to support it along the remaining two edges. The second spacers are then pressed to pressure the panel from the front side against the first spacers, wherein the panel is clamped between the first and second spacers.

20 Claims, 8 Drawing Sheets

LIQUID CRYSTAL DISPLAY DEVICE AND METHOD FOR MANUFACTURING LIQUID CRYSTAL DEVICE

BACKGROUND OF THE INVENTION

1. Technical Field

The present invention relates to liquid crystal display devices and methods for manufacturing liquid crystal devices.

2. Description of the Related Art

In recent years, as liquid crystal display devices have come to be used as display devices of television receivers, the screens of such liquid crystal display devices have become increasingly bigger. And as their screens keep becoming bigger, there is the problem that the viewing angle difference between the viewing angle when the viewer views the center portion of the screen and the viewing angle when the viewer views the left and right edges of the screen increases (throughout this specification, the technical term "viewing angle" is defined as the angle between the line of sight of the viewer viewing the screen and the tangent to the intersection between the line of sight and the screen surface, and their difference is defined as and used to mean the "viewing angle difference").

More specifically, as shown in FIG. 8, in a situation in which a screen of 980 mm width is viewed from a location that is 1650 mm removed from that screen, if the screen is flat, then there will be a viewing angle difference of about 17° between the viewing angle when viewing the center portion of the screen and the viewing angles when viewing the two edges.

Furthermore, there is the problem that reflections become large, too.

In order to improve this viewing angle difference, it is advantageous to curve the screen to a concave shape, as disclosed in Japanese Published Utility Model S58-52513.

However, with the manufacturing method of manufacturing curved glass sheets and filling the liquid crystal between two such curved glass sheets to manufacture a curved panel, it is difficult to make the distance between the two curved glass sheets constant, and there is the problem that color irregularities occur. Furthermore, even though Document 1 states that the viewing angle difference can be improved by curving the screen, it does not elaborate on the method for manufacturing such a curved screen. Also, there is no description of a specific structure of a liquid crystal display device having such a curved liquid crystal panel.

BRIEF SUMMARY OF THE INVENTION

Accordingly, it is an object of the present invention to provide a liquid crystal display device and a method for manufacturing such a liquid crystal display device, which has a curved liquid crystal panel that can be realized while hardly changing at all the manufacturing steps and the structure of current liquid crystal display devices, and which to the extent possible does not necessitate any new materials or manufacturing methods.

In the course of examining various manufacturing methods in order to address the above-mentioned problems, it has been found that within a certain curvature, glass sheets that by common sense were believed to be rigid and not deformable or that were believed to break when deformed can be easily deformed or do not break when deformed.

On the basis of this knowledge, a display device according to a first aspect of the present invention includes a display panel having a concavely curved shape.

According to a second aspect of the present invention, in a display device according to the first aspect, the concavely curved shape is substantially the same curved shape as the curved shape that is attained when two opposing edges of a flat display panel are supported and raised upward, and the display panel curves naturally in this suspended state (referred to as "curved shape with suspended panel" below).

According to a third aspect of the present invention, in a display device according to the first aspect, the concavely curved shape is substantially the same curved shape as the curved shape that is attained when a flat display panel is placed on a flat table, and then two opposing edges of that display panel are raised upward by a predetermined height to an extent that a portion of the display panel still contacts the flat table, so that the display panel curves (referred to as "curved shape with supported panel bottom" below).

According to a fourth aspect of the present invention, a display device includes: a display panel; first spacers that are placed on a rear side of two opposing edges of the display panel and support the display panel from the rear side; second spacers that are placed on a front side of the two opposing edges of the display panel and press the two opposing edges of the display panel from the front side against the first spacers; and third spacers having a constant height that are placed on the rear side of the remaining two edges of the display panel; wherein the shape of the first spacers and the second spacers contacting the display panel is a concavely curved shape; and wherein the display panel, which was initially flat, is curved in accordance with the concavely curved shape of the first spacers and the second spacers, by sandwiching the two opposing edges of the display panel between the first spacers and the second spacers.

According to a fifth aspect of the present invention, in a display device according to the fourth aspect, the shape of the surface where the first spacers contact the display panel and the shape of the surface where the second spacers contact the display panel is substantially the same curved shape as the curved shape that is attained when two opposing edges of a flat display panel are supported and raised upward, and the display panel curves naturally in this suspended state.

According to a sixth aspect of the present invention, in a display device according to the fourth aspect, the shape of the surface where the first spacers contact the display panel and the shape of the surface where the second spacers contact the display panel is substantially the same curved shape as the curved shape that is attained when a flat display panel is placed on a flat table, and then two opposing edges of that display panel are raised upward by a predetermined height to an extent that a portion of the display panel still contacts the flat table, so that the display panel curves.

According to a seventh aspect of the present invention, in a display device according to the sixth aspect, the predetermined height is at least 1 cm and at most 4 cm.

According to an eighth aspect of the present invention, in a display device according to the sixth aspect, when the two opposing edges of the display panel are raised upward by the predetermined height to an extent that a portion of the display panel still contacts the flat table, then the surface area of the surface of the display panel that contacts the flat table is at least 1% and at most 50% of the entire surface area of the display panel.

According to a ninth aspect of the present invention, in a display device according to any of the first to eighth aspects, the display panel is a liquid crystal panel.

According to a tenth aspect of the present invention, in a display device according to any of the first to eighth aspects, the display panel is an organic electroluminescent display (ELD) panel.

According to an eleventh aspect of the present invention, in a display device according to any of the first to eighth aspects, the display panel is an inorganic ELD panel.

According to a twelfth aspect of the present invention, in a display device according to any of the first to eighth aspects, the display panel is a reflective display panel.

A thirteenth aspect of the present invention is a method for manufacturing a display device whose display panel has a concavely curved shape.

According to a fourteenth aspect of the present invention, in a method for manufacturing a display device according to the thirteenth aspect, the concavely curved shape is substantially the same curved shape as the curved shape that is attained when two opposing edges of a flat display panel are supported and raised upward, and the display panel curves naturally in this suspended state.

According to a fifteenth aspect of the present invention, in a method for manufacturing a display device according to the thirteenth aspect, the concavely curved shape is substantially the same curved shape as the curved shape that is attained when a flat display panel is placed on a flat table, and then two opposing edges of that display panel are raised upward by a predetermined height to an extent that a portion of the display panel still contacts the flat table, so that the display panel curves.

According to a sixteenth aspect of the present invention, a method for manufacturing a display device includes: placing first spacers having a concavely curved surface on the rear side of two opposing edges of a display panel and supporting the display panel from the rear side with the concavely curved surface of the first spacers; placing second spacers having a concavely curved surface on the front side of the two opposing edges of the display panel and pressing the display panel from the front side with the concavely curved surface of the second spacers; placing third spacers having a constant height on the rear side of the remaining two sides of the display panel to support the remaining two sides of the display panel; and providing the display panel with a concavely curved shape by sandwiching the display panel, which was initially flat, between the first spacers and the second spacers.

According to a seventeenth aspect of the present invention, in a method for manufacturing a display device according to the sixteenth aspect, the concavely curved shape of the concavely curved surfaces of the first spacers and the second spacers is substantially the same curved shape as the curved shape that is attained when two opposing edges of a flat display panel are supported and raised upward, and the display panel curves naturally in this suspended state.

According to an eighteenth aspect of the present invention, in a method for manufacturing a display device according to the sixteenth aspect, the concavely curved shape of the concavely curved surfaces of the first spacers and the second spacers is substantially the same curved shape as the curved shape that is attained when a flat display panel is placed on a flat table, and then two opposing edges of that display panel are raised upward by a predetermined height to an extent that a portion of the display panel still contacts the flat table, so that the display panel curves.

According to a nineteenth aspect of the present invention, in a method for manufacturing a display device according to the eighteenth aspect, the predetermined height is at least 1 cm and at most 4 cm.

According to a twentieth aspect of the present invention, in a method for manufacturing a display device according to the eighteenth aspect, when the two opposing edges of the display panel are raised upward by the predetermined height to an extent that a portion of the display panel still contacts the flat table, then the surface area of the surface of the display panel that contacts the flat table is at least 1% and at most 50% of the entire surface area of the display panel.

According to a twenty-first aspect of the present invention, in a method for manufacturing a display device according to any of the thirteenth to twentieth aspect, the display panel is a liquid crystal display panel.

According to a twenty-second aspect of the present invention, in a method for manufacturing a display device according to any of the thirteenth to twentieth aspect, the display panel is an organic ELD panel.

According to a twenty-third aspect of the present invention, in a method for manufacturing a display device according to any of the thirteenth to twentieth aspect, the display panel is an inorganic ELD panel.

According to a twenty-fourth aspect of the present invention, in a method for manufacturing a display device according to any of the thirteenth to twentieth aspect, the display panel is a reflective display panel.

With the first aspect of the present invention, the viewing angle difference when the viewer of the screen views the center portion or the two edges of the screen can be diminished due to the curving of the screen. Furthermore, reflections can be decreased as well.

With the second aspect of the present invention, it is possible to manufacture a display device having a curved shape using a flat display plate, such as a flat glass sheet, which can be easily manufactured, and without manufacturing a curved display panel plate, such as a curved glass sheet.

With the third aspect of the present invention, in addition to the effect of the first aspect of the present invention, the effect that the curved shape can be easily determined is achieved.

With the fourth aspect of the present invention, in addition to the effect of the second aspect of the present invention, a display device having a curved shape can be manufactured substantially without changing the conventional manufacturing method, by adding spacers, which are cheap components, and furthermore the curved shape can be determined easily.

With the fifth aspect of the present invention, in addition to the effect of the fourth aspect of the present invention, the curved shape of the spacers can be easily determined.

With the sixth aspect of the present invention, in addition to the effect of the fourth aspect of the present invention, the degree of curvature of the curved shape can be adjusted.

With the seventh aspect of the present invention, in addition to the effect of the sixth aspect of the present invention, the degree of curvature of the curved shape can be adjusted within a constant range.

With the eighth aspect of the present invention, in addition to the effect of the sixth aspect of the present invention, the degree of curvature of the curved shape can be adjusted more precisely.

With the ninth aspect of the present invention, in addition to the effect of the first to eighth aspects of the present invention, it is possible to manufacture a display device having a curved liquid crystal panel without manufacturing a glass sheet having a curved shape, which is difficult to manufacture.

With the tenth aspect of the present invention, the effects of the first to eighth aspects can also be attained for an organic ELD device.

With the eleventh aspect of the present invention, the effects of the first to eighth aspects can also be attained for an inorganic ELD device.

With the twelfth aspect of the present invention, the effects of the first to eighth aspects can also be attained for a reflective display device.

With the thirteenth aspect of the present invention, the same effect as in the first aspect can be attained.

With the fourteenth aspect of the present invention, the same effect as in the second aspect can be attained.

With the fifteenth aspect of the present invention, the same effect as in the third aspect can be attained.

With the sixteenth aspect of the present invention, the same effect as in the fourth aspect can be attained.

With the seventeenth aspect of the present invention, the same effect as in the fifth aspect can be attained.

With the eighteenth aspect of the present invention, the same effect as in the sixth aspect can be attained.

With the nineteenth aspect of the present invention, the same effect as in the seventh aspect can be attained.

With the twentieth aspect of the present invention, the same effect as in the eighth aspect can be attained.

With the twenty-first aspect of the present invention, the same effect as in the ninth aspect can be attained.

With the twenty-second aspect of the present invention, the same effect as in the tenth aspect can be attained.

With the twenty-third aspect of the present invention, the same effect as in the eleventh aspect can be attained.

With the twenty-fourth aspect of the present invention, the same effect as in the twelfth aspect can be attained.

DETAILED DESCRIPTION OF THE INVENTION

The following is a description of preferred embodiments of the invention, with reference to the accompanying drawings.

Embodiment 1

Figure 1:
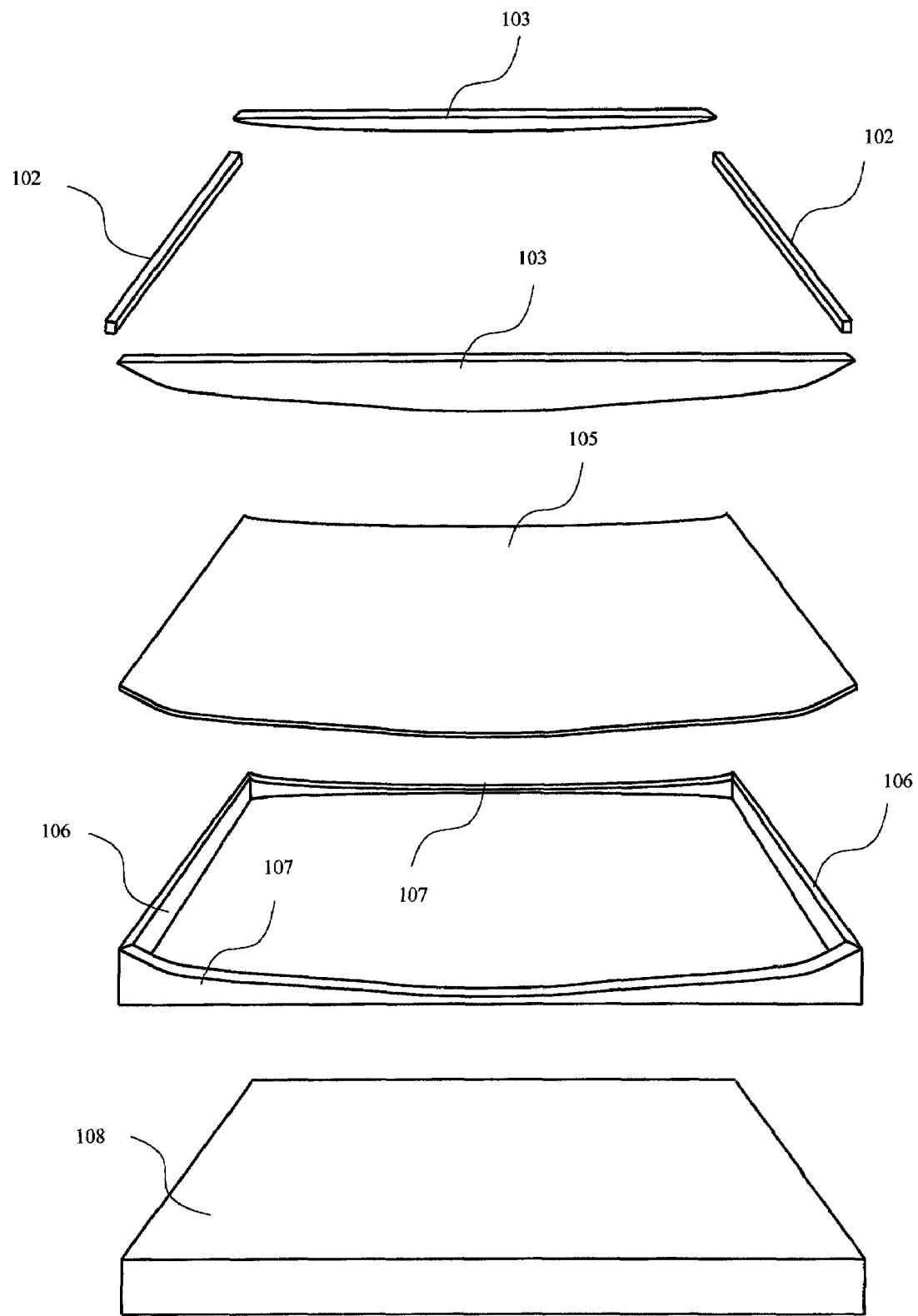
FIG. 1 is an exploded view of the components of a liquid crystal display device according to Embodiment 1 of the present invention.

FIG. 1 is an exploded view of the components of a liquid crystal display device according to Embodiment 1 of the present invention. Two opposing edges of a liquid crystal panel 105 are placed on first spacers 107 having a concavely curved shape, and the other two opposing edges are placed on third spacers 106. Thus, a naturally curving liquid crystal panel having a structure in which a liquid crystal is sandwiched by two thin glass sheets is achieved. The edges of the curved liquid crystal panel that are supported by the first spacers 107 are pressed down by second spacers 103. Furthermore, the two other opposing edges that are supported by the third spacers 106 are pressed down by auxiliary spacers 102. However, it is also possible not to install these auxiliary spacers 102, and to devise a structure that is pressed down by a bezel or the like.

Thus, by arranging the liquid crystal panel 105 and the various kinds of spacers, the liquid crystal panel 105 is maintained in a concavely curved shape, even when it is put upright from the horizontal orientation to the vertical orientation.

Furthermore, the first spacers 107 and the third spacers 106 may be physically connected and integrated into one piece, or they may be unconnected. Also, the third spacers 106 may be made of a material with elasticity, and not have a curved shape at first, but may be formed to a curved shape by sandwiching them between the liquid crystal panel and a bezel.

Numeral 108 denotes a backlight or the like, which is not a characterizing technical feature. A conventional backlight may be used for it, so that further explanations have been omitted.

Referring to the accompanying drawings, the following is an explanation of a method for providing the first spacers 107 with the concavely curved shape according to Embodiment 1.

Figure 2:
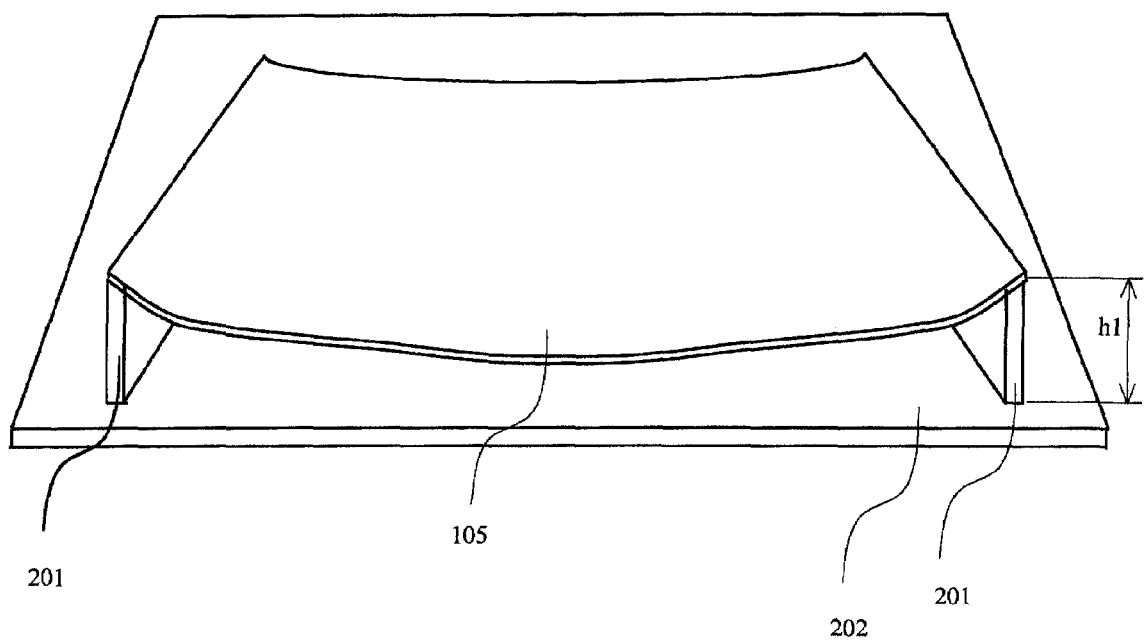
FIG. 2 is a diagram showing the situation after the liquid crystal panel has been placed on a flat table, and in which the two opposing edges are raised upward to the extent that the center portion of the liquid crystal panel 105 is removed from the table.

FIG. 2 is a diagram showing the situation after the liquid crystal panel has been placed on a flat table, and in which the two opposing edges are raised upward to the extent that the center portion of the liquid crystal panel 105 is removed from the table. When the liquid crystal panel 105 is placed on a flat table 202 and the two opposing edges of the liquid crystal panel 105 are raised upward, the liquid crystal panel 105 curves, and the center portion of the liquid crystal panel 105 droops downward while being supported by the flat table 202. Then, when the liquid crystal panel 105 is lifted further, the center portion of the liquid crystal panel 105 separates from the flat table 202. After this, the curved shape does not change, even when the liquid crystal panel 105 is lifted further. Accordingly, the curved shape of the first spacers 107 is fabricated to match the curved shape of the liquid crystal panel 105 in this state. Numeral 201 in FIG. 2 denotes support portions that support the two opposing edges of the liquid crystal panel 105 in this state, and h1 denotes the height of these support portions 201. The height of the first spacers 107 and the third spacers 106 is determined in accordance with this height h1.

The following is an explanation of the structure of the liquid crystal display device according to Embodiment 1, referring to its cross-section.

Figure 4:
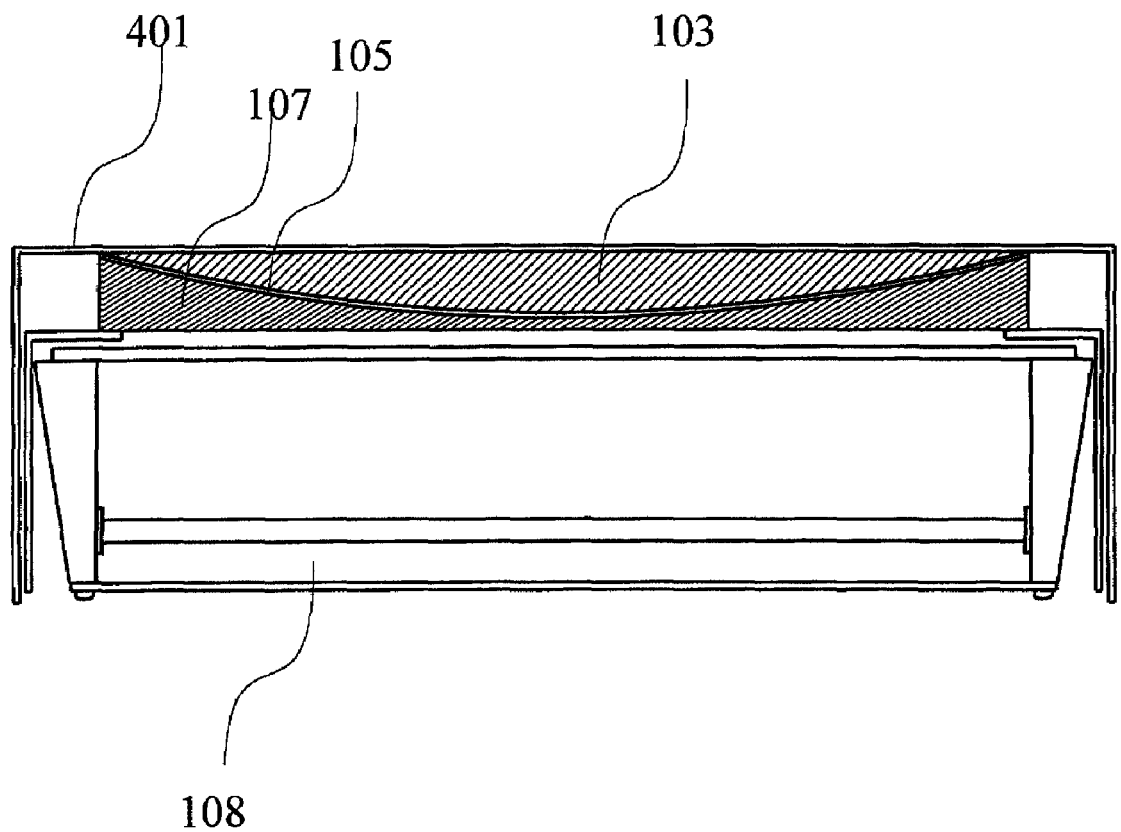
FIG. 4 is a cross-sectional view of the liquid crystal display device according to Embodiment 1.

FIG. 4 is a cross-sectional view of the liquid crystal display device according to Embodiment 1.

The liquid crystal panel 105 is placed in its curved shape on the first spacers 107, and is fixed by the second spacers 103.

In FIG. 4, numeral 108 denotes a backlight unit, and numeral 401 denotes a bezel. The bezel 401 is higher than a liquid crystal display device having an ordinary flat liquid crystal panel, the height difference corresponding to the height of the first spacers 107, whereas with regard to other aspects, it is similar to a liquid crystal display device having an ordinary flat liquid crystal panel.

Figure 6:
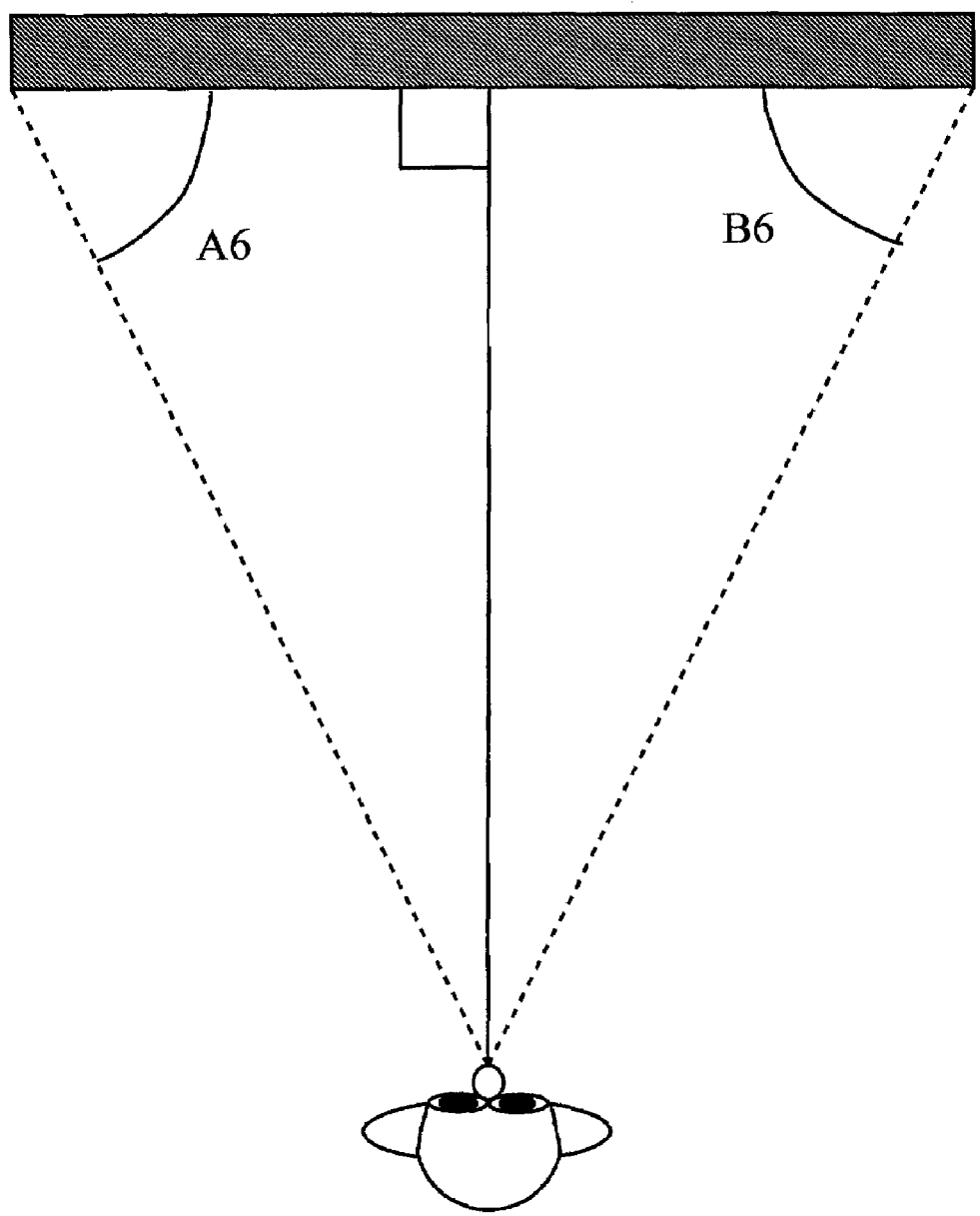
FIG. 6 is a diagram showing the viewing angle difference between the cases of viewing the screen center and the two edges of a flat screen.
Figure 7:
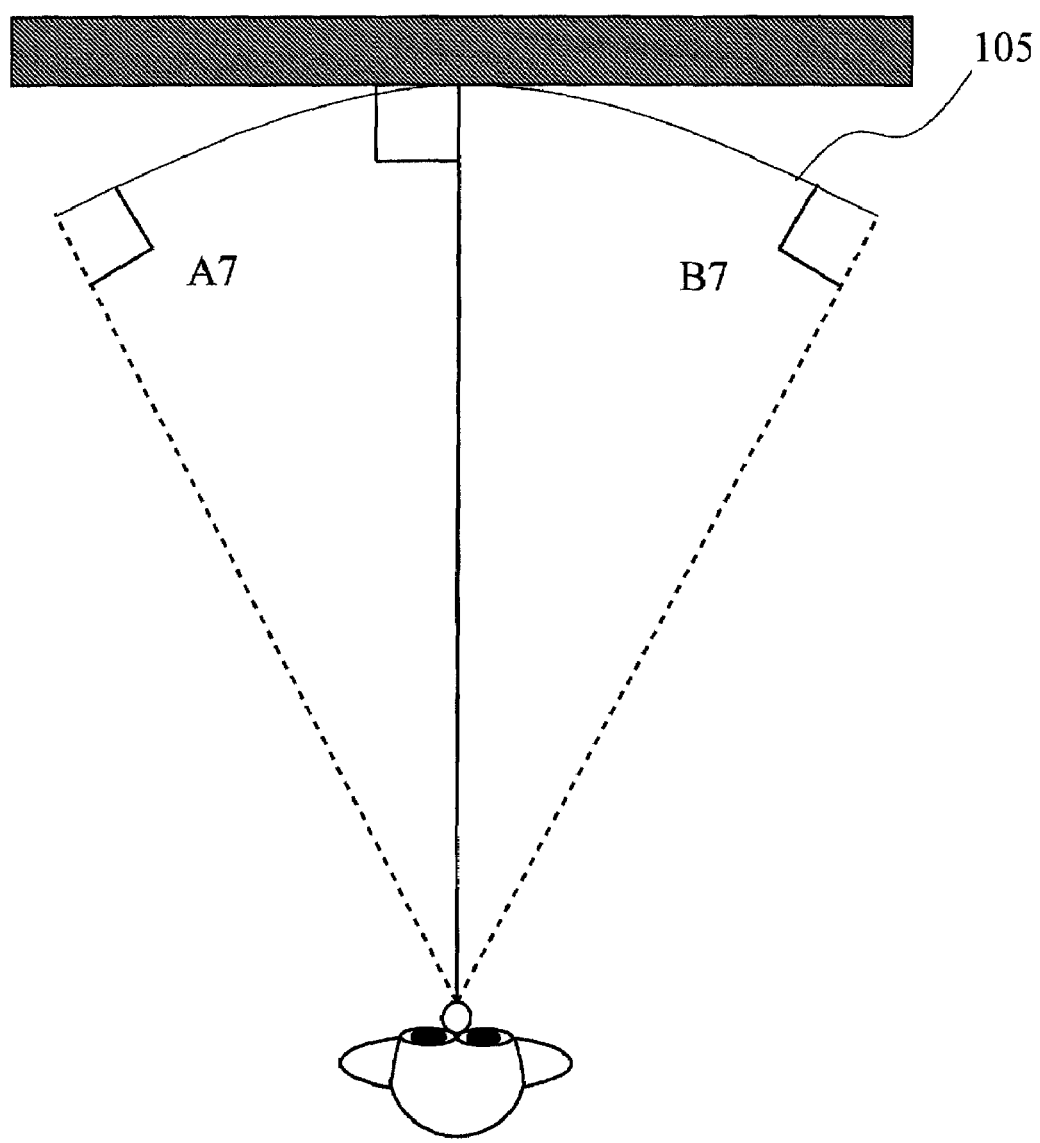
FIG. 7 shows the viewing angle difference for the case that the screen center and the two edges of a curved screen are viewed.

In the liquid crystal display device according to Embodiment 1, which is manufactured by determining the curved shape with this method, the viewing angle difference between viewing the center and the two edges of the screen can be made smaller than the viewing angle difference for conventional flat screens. This is explained with reference to the figures. FIG. 6 is a diagram showing the viewing angle difference between viewing the screen center and viewing the two edges for the case that the screen is a flat screen. The angle between the line of sight and the screen is a right angle when viewing the center portion of the screen, whereas the angles (A6, B6) between the line of sight and the screen when viewing the two edges are less than 90°, so that there is a viewing angle difference. For comparison, FIG. 7 shows the viewing angle difference for the case that the center and the two edges of the curved screen 105 are viewed. The angle between the line of sight and the screen when viewing the center of the screen as well as the angle between the line of sight and the screen when viewing the two edges of the screen are both about 90°, so that there is substantially no viewing angle difference. Depending on the extent of the screen curvature, the angle between the line of sight and the screen when viewing the two edges of the screen may be less than 90°, but that angle will be larger than the angle between the line of sight and the screen in the case that the two edges of a flat screen are viewed, so that the viewing angle difference is, in any case, reduced and thus improved.

Figure 8:
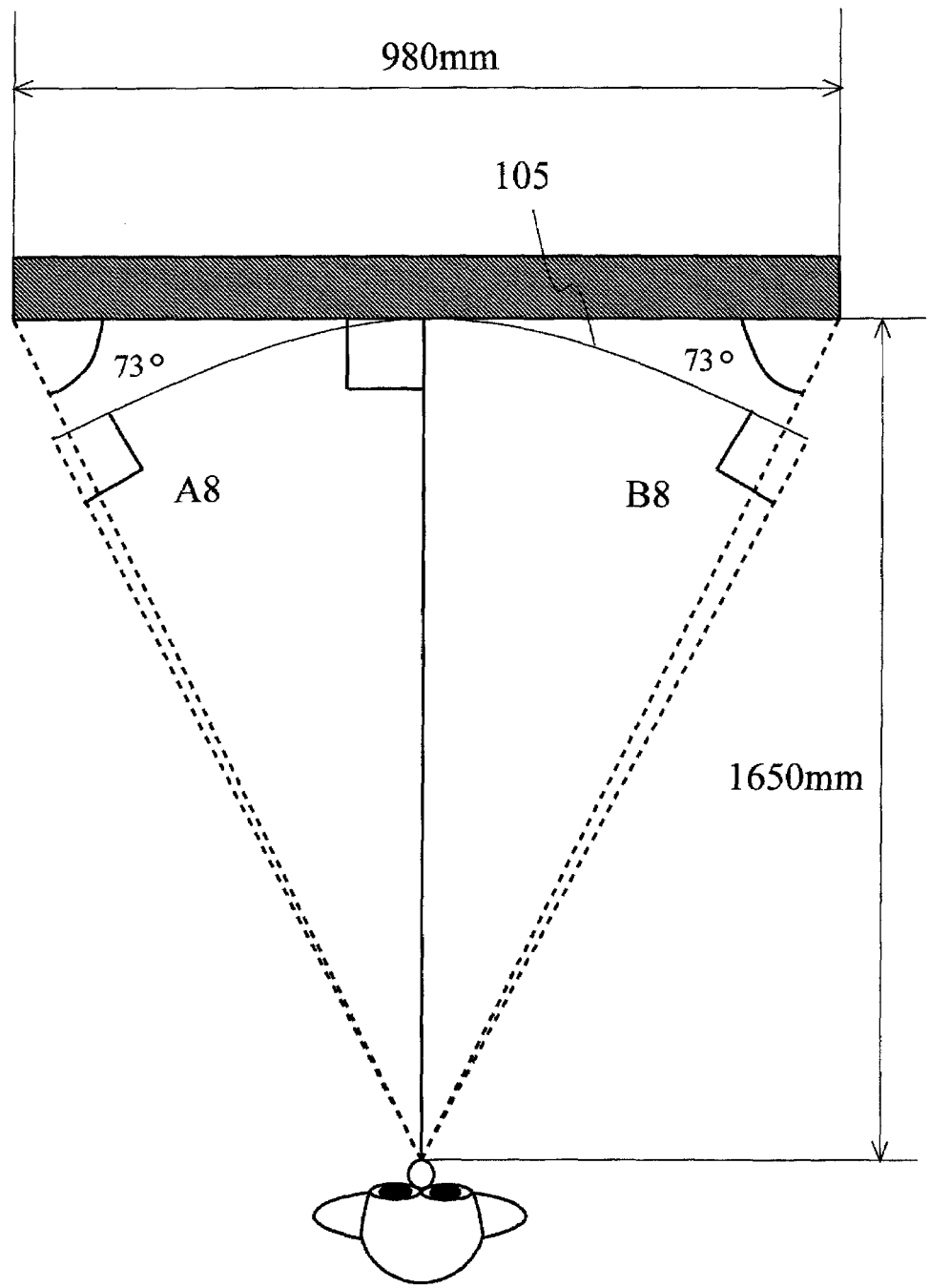
FIG. 8 is a diagram showing the viewing angle difference between the viewing angle in the case that the center portion of a flat screen with a lateral width of 980 mm is viewed from a location that is 1650 mm removed from the screen and the viewing angle in the case that the two edges of that screen are viewed.

Referring to the figures, the following is an explanation of an actually measured example. FIG. 8 is a diagram showing the viewing angle difference between the viewing angle in the case that the center portion of a flat screen with a lateral width of 980 mm is viewed from a location that is 1650 mm removed from the screen and the viewing angle in the case that the two edges of that screen are viewed. As can be seen from FIG. 8, the angles between the line of sight and the screen when viewing either of the two sides of this flat screen are about 73°, whereas the angle between the line of sight and the screen when viewing the center portion of the screen is 90°, so that there is a viewing angle difference of about 17°. By contrast, when the screen is curved, it is possible to eliminate the viewing angle difference if there is a sufficient curvature, and the viewing angle difference can be improved by favorably curving the screen.

Furthermore, it is possible to improve the reflections by curving the screen.

Embodiment 2

Next, a liquid crystal display device according to Embodiment 2 will be explained. The difference between the liquid crystal display device according to Embodiment 2 and the liquid crystal display device according to Embodiment 1 is only that the degree of the curvature of the curved shape of the liquid crystal panel is different, so that the exploded view of the components of the liquid crystal apparatus is the same as that shown in FIG. 1. The following explanation focuses on the differences to the liquid crystal display device according to Embodiment 1.

A method for obtaining the curved shape of the liquid crystal panel of the liquid crystal display device according to Embodiment 2 is explained with reference to the figures.

Figure 3:
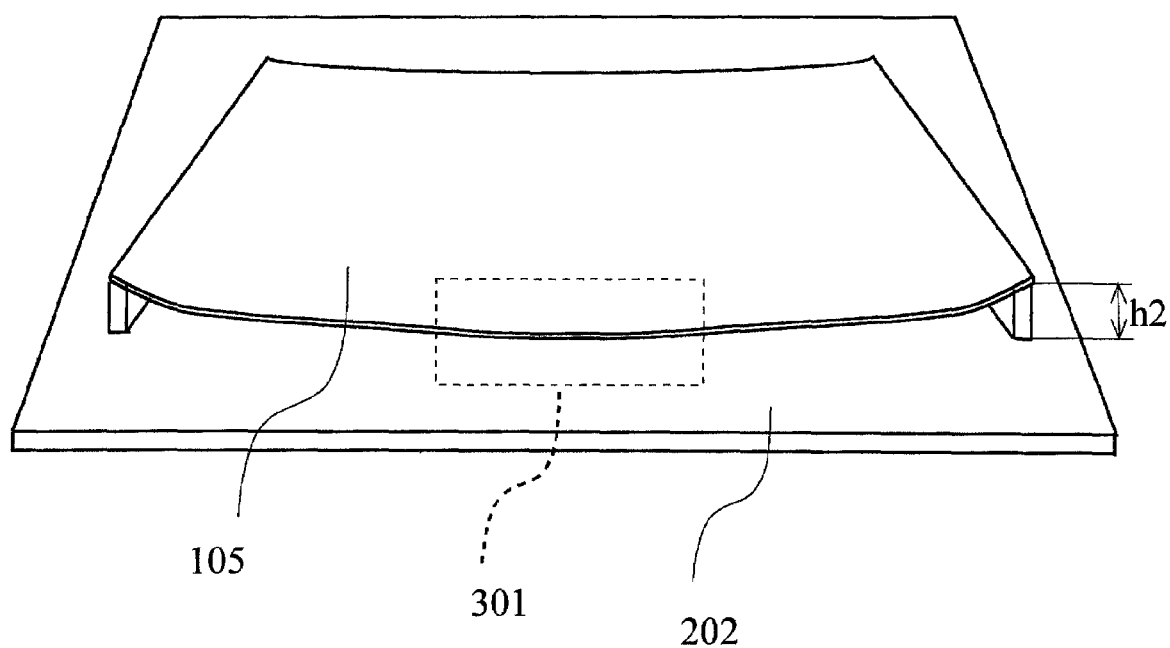
FIG. 3 is a diagram showing the situation after the liquid crystal panel has been placed on a flat table, and then the two opposing edges have been lifted to an extent that the portion at the center of the liquid crystal panel 105 is still supported by the table and contacts the table.

FIG. 3 is a diagram showing the situation after the liquid crystal panel has been placed on a flat table, and in which the two opposing edges have been lifted to an extent that a portion at the center of the liquid crystal panel 105 is still supported by the table and contacts the table.

In this method for obtaining the curved shape of the liquid crystal panel of the liquid crystal display device according to Embodiment 2, the curved shape of the liquid crystal panel is made less curved than the curved shape of the liquid crystal panel of the liquid crystal display device according to Embodiment 1, which is advantageous to reduce the stress applied to the liquid crystal panel.

Also in this method, as in the first method, first, the liquid crystal panel 105 is placed on the flat table 202, and the two opposing edges of the liquid crystal panel 105 are raised to curve the liquid crystal panel 105. The raising is stopped in a state in which the center portion of the liquid crystal panel 105 is still supported by and in contact with the flat table 202, and the curved shape of the first spacers 107 is set to substantially the same shape as the curved shape of the liquid crystal panel in this state. Numeral 301 in FIG. 3 denotes the portion where the center portion of the liquid crystal panel 105 is in contact with the flat table 202. Furthermore, h2 in FIG. 3 denotes the height that the two opposing edges of the liquid crystal panel 105 are raised. The height of the first spacers 107 and the third spacers 106 is set in accordance with this height h2. Furthermore, the greater the surface area of the liquid crystal panel 105 that contacts the flat table is, the smaller the curvature and the lower the height h2 become. Or conversely, the smaller the surface area that touches the flat table is, the steeper the curvature and the higher the height h2 become. Thus, the desired extent of the curvature of the liquid crystal panel 105 can be changed by changing the ratio of the surface area contacting the flat table to the entire surface area of the liquid crystal panel 105.

Moreover, if a portion of the liquid crystal panel contacts the flat table in this manner, then the shape of the first spacers 107 corresponding to this contact portion is made flat, or no first spacers 107 are provided for this portion, and the liquid crystal panel 105 is supported by, for example, the backlight on which the first spacers 107 are placed.

The following is an explanation of the structure of the liquid crystal display device according to this Embodiment 2, referring to its cross section.

Figure 5:
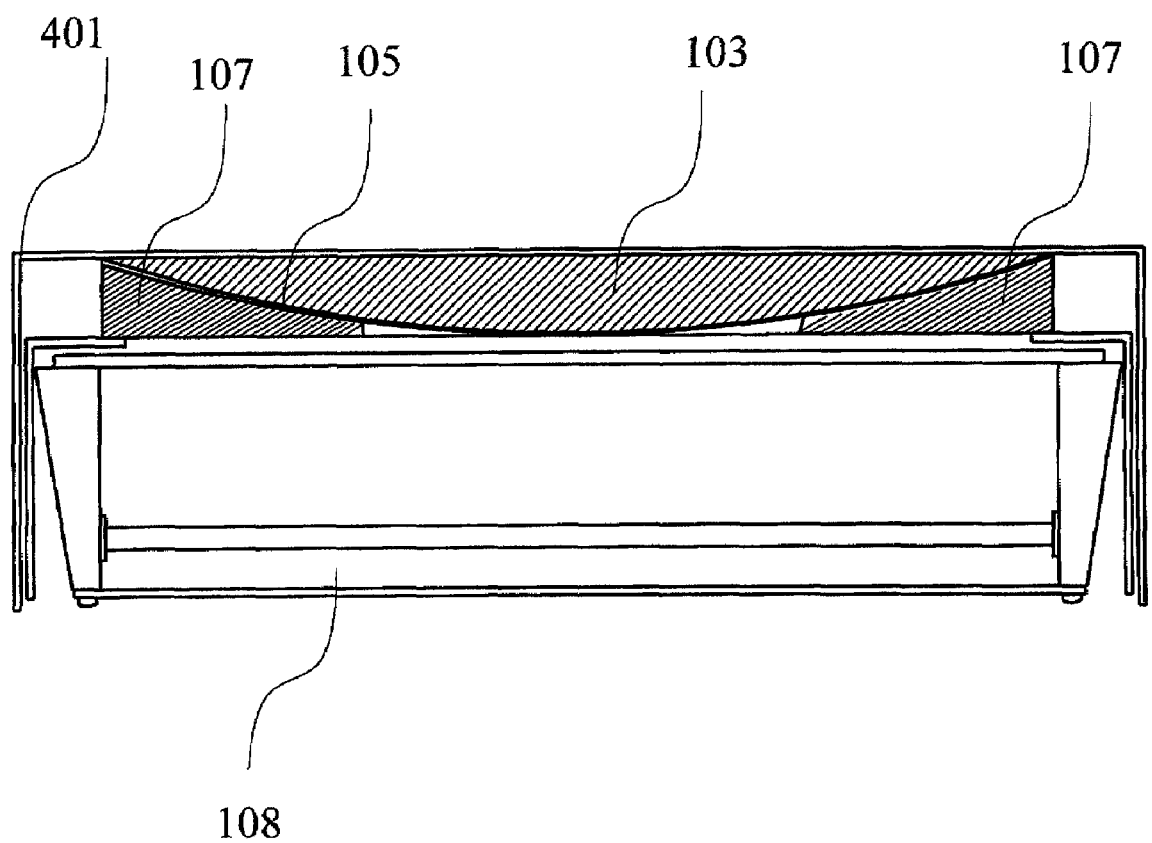
FIG. 5 is a cross-sectional view of the liquid crystal display device according to Embodiment 2.

FIG. 5 is a cross-sectional view of the liquid crystal display device according to Embodiment 2.

As in the liquid crystal display device according to Embodiment 1, the liquid crystal panel 105 is placed in its curved shape on the first spacers 107, and is fixed by the second spacers 103, pressing it down from the front side of the liquid crystal panel. Also in FIG. 5, numeral 108 denotes a backlight unit, and numeral 401 denotes a bezel. The bezel 401 is higher than a liquid crystal display device having an ordinary flat liquid crystal panel, the height difference corresponding to the height of the first spacers 107, whereas with regard to other aspects, it is similar to a liquid crystal display device having an ordinary flat liquid crystal panel. The difference to the liquid crystal display device according to Embodiment 1 is that the first spacers 107 are physically fragmented at the center portion of the liquid crystal panel, and installed independently at the left and right edges. However, it is also possible to integrate them into one piece with a flat shape at the center portion, without fragmenting them.

Like in the liquid crystal display device according to Embodiment 1, also with the liquid crystal display device according to Embodiment 2, which is manufactured by determining the curved shape with the above-described method, the viewing angle difference between viewing the center and the two edges of the screen can be made smaller than the viewing angle difference in conventional flat screens.

With the liquid crystal display device according to Embodiment 2, the desired curved shape is obtained by changing the ratio of the surface area of the liquid crystal panel contacting the flat table to the entire surface area of the liquid crystal panel when raising the two opposing edges of the liquid crystal panel. Thus, it is possible to balance the advantageous effects regarding the viewing angle difference and reflections by curving the liquid crystal panel with the disadvantageous effects, such as the increase of stress due to the curving.

Furthermore, in both the liquid crystal display device according to Embodiment 1 and the liquid crystal display device according to Embodiment 2, it is possible to use a conventional flat liquid crystal panel as it is, and only the spacers are required as additional components. Furthermore, conventional equipment for manufacturing liquid crystal display devices can be used, and it is possible to provide liquid crystal display devices having a concavely curved screen without requiring new investments.

Embodiment 3

The structure and manufacturing method of a liquid crystal display device having a curved shape as shown in Embodiment 1 and Embodiment 2 can be similarly applied to any display device having a display panel that curves naturally when the two opposing edges of the display panel are raised, even when the display panel is not a liquid crystal panel. Examples of such display devices are organic ELD devices, inorganic ELD devices, and reflective display devices. As for the structure and manufacturing method, it is sufficient to replace the liquid crystal panels of Embodiment 1 and Embodiment 2 with organic ELD panels, inorganic ELD panels or reflective display panels, respectively, so that further explanations have been omitted.

What is claimed is:

1. A display device comprising:
a flat display panel,
first and second spacers each having a concavely curved shape, and
a third spacer, wherein
the flat display panel is sandwiched between the first and the second spacers so that the display device is maintained in a concavely curved shape,
the first spacer is placed on a rear side of the flat display panel to support the flat display panel,
the second spacer is placed on a front side of the flat display panel to press the flat display panel against the first spacer,
the third spacer is placed on the rear side of the flat display panel to support the flat display panel, and
the front side of the flat display panel supported by the third spacer is pressed down by an auxiliary spacer or a bezel.

2. The display device according to claim 1, wherein the concavely curved shape is substantially the same curved shape as the curved shape that is attained when two opposing edges of a flat display panel are supported and raised upward, and the display panel curves naturally in this suspended state.

3. The display device according to claim 1, wherein the concavely curved shape is substantially the same curved shape as the curved shape that is attained when a flat display panel is placed on a flat table, and then two opposing edges of that display panel are raised upward by a predetermined height to an extent that a portion of the display panel still contacts the flat table, so that the display panel curves.

4. The display device according to claim 1, wherein the first spacer and the third spacer are physically connected and integrated into one piece.

5. The display device according to claim 1, wherein the first spacer and the third spacer are unconnected.

6. A display device comprising: an initially flat display panel defining four edges; first spacers that are placed on a rear side of two opposing edges of the display panel and support the display panel from the rear side; second spacers that are placed on a front side of the two opposing edges of the display panel and press the two opposing edges of the display panel from the front side against the first spacers; third spacers having a constant height that are placed on the rear side of the remaining two edges of the display panel; wherein the shape of the surface of the first spacers and the second spacers contacting the display panel is a concavely curved shape; and the display panel is curved in accordance with the concavely curved shape of the first spacers and the second spacers, by sandwiching the two opposing edges of the display panel between the first spacers and the second spacers.

7. The display device according to claim 6, wherein the shape of the surface where the first spacers contact the display panel and the shape of the surface where the second spacers contact the display panel is substantially the same curved shape as the curved shape that is attained when two opposing edges of a flat display panel are supported and raised upward, and the display panel curves naturally in this suspended state.

8. The display device according to claim 6, wherein the shape of the surface where the first spacers contact the display panel and the shape of the surface where the second spacers contact the display panel is substantially the same curved shape as the curved shape that is attained when a flat display panel is placed on a flat table, and then two opposing edges of that display panel are raised upward by a predetermined height to an extent that a portion of the display panel still contacts the flat table, so that the display panel curves.

9. The display device according to claim 8, wherein the predetermined height is at least 1 cm and at most 4 cm.

10. The display device according to claim 8, wherein when the two opposing edges of the display panel are raised upward by the predetermined height to an extent that a portion of the display panel still contacts the flat table, then the surface area of the surface of the display panel that contacts the flat table is at least 1% and at most 50% of the entire surface area of the display panel.

11. A display device according to any of claims 6 to 10, wherein the display panel is a liquid crystal display panel.

12. A display device according to any of claims 6 to 10, wherein the display panel is an organic electroluminescent display panel.

13. A display device according to any of claims 6 to 10, wherein the display panel is an inorganic ELD panel.

14. A display device according to any of claims 6 to 10, wherein the display panel is a reflective display panel.

15. A method for manufacturing a display device, comprising: placing first spacers having a concavely curved shape on the rear side of two opposing edges of an initially flat display panel defining four edged, and supporting the display panel from the rear side with the concavely curved shape of the first spacers; placing second spacers having a concavely curved shape on the front side of the two opposing edges of the display panel and pressing the display panel from the front side with the concavely curved shape of the second spacers; placing third spacers having a constant height on the rear side of the remaining two edges of the display panel to support the remaining two edges of the display panel; and providing the display panel with a concavely curved shape by sandwiching the display panel between the first spacers and the second spacers.

16. The method for manufacturing a display device according to claim 15, wherein the concavely curved shape of the concavely curved surfaces of the first spacers and the second spacers is substantially the same curved shape as the curved shape that is attained when two opposing edges of a flat display panel are supported and raised upward, and the display panel curves naturally in this suspended state.

17. The method for manufacturing a display device according to claim 15, wherein the concavely curved shape of the concavely curved surfaces of the first spacers and the second spacers is substantially the same curved shape as the curved shape that is attained when a flat display panel is placed on a flat table, and then two opposing edges of that display panel are raised upward by a predetermined height to an extent that a portion of the display panel still contacts the flat table, so that the display panel curves.

18. The method for manufacturing a display device according to claim 17, wherein the predetermined height is at least 1 cm and at most 4 cm.

19. The method for manufacturing a display device according to claim 17, wherein when the two opposing edges of the display panel are raised upward by the predetermined height to an extent that a portion of the display panel still contacts the flat table, then the surface area of the surface of the display panel that contacts the flat table is at least 1% and at most 50% of the entire surface area of the display panel.

20. A method for manufacturing a display device, comprising:
    providing first and second spacers each having a concavely curved shape,
    sandwiching a flat display panel between the first and the second spacers comprising:
        placing the first spacer on a rear side of the flat display panel to support the flat display panel, and
        placing the second spacer on a front side of the flat display panel to press the flat display panel against the first spacer,
    placing a third spacer on the rear side of the flat display panel to support the flat display panel cooperatively, and
    installing an auxiliary spacer on the front side of the flat display panel to press the flat display panel against the third spacer.

* * * * *